US012583578B2

(12) United States Patent　　(10) Patent No.:　　US 12,583,578 B2

Bill　　(45) Date of Patent:　　Mar. 24, 2026

(54) AIRCRAFT LANDING GEAR ARRANGEMENT

(71) Applicant: Airbus Operations Limited, Bristol (GB)

(72) Inventor: Andrew Bill, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 595 days.

(21) Appl. No.: 17/954,108

(22) Filed: Sep. 27, 2022

(65) Prior Publication Data

US 2023/0095069 A1　　Mar. 30, 2023

(30) Foreign Application Priority Data

Sep. 28, 2021　　(GB) ...................................... 2113852

(51) Int. Cl.
| | |
|---|---|
| *F16D 65/847* | (2006.01) |
| *B64C 25/32* | (2006.01) |
| *B64C 25/44* | (2006.01) |
| *F16D 65/853* | (2006.01) |

(52) U.S. Cl.
CPC ............ *B64C 25/44* (2013.01); *B64C 25/405* (2013.01); *F16D 65/853* (2013.01)

(58) Field of Classification Search
CPC ..... B64C 25/44; B64C 25/405; F16D 65/853; F16D 65/847; F16D 2065/783
See application file for complete search history.

(56) References Cited

U.S. PATENT DOCUMENTS

| | | | | |
|---|---|---|---|---|
| 3,301,357 | A | 1/1967 | Cussons et al. | |
| 3,734,247 | A | 5/1973 | Buckley | |
| 5,190,247 | A | 3/1993 | Le Chatelier | |
| 8,517,303 | B2 * | 8/2013 | Dilmaghani | ........... B64C 25/50 |
| | | | | 244/50 |
| 10,336,473 | B2 * | 7/2019 | Bill | ........................... B64F 5/60 |
| 10,935,093 | B2 * | 3/2021 | Hosamane | .............. F16D 65/78 |
| 11,035,425 | B2 * | 6/2021 | Serra | ....................... F16D 61/00 |
| 11,493,101 | B2 * | 11/2022 | Kuemmerling | ..... F16D 65/0031 |
| 2009/0218440 | A1 * | 9/2009 | Dilmaghani | ........... B64C 25/50 |
| | | | | 244/50 |
| 2010/0187897 | A1 | 7/2010 | Caule | |
| 2011/0120111 | A1 | 5/2011 | Alexander et al. | |
| 2013/0292992 | A1 | 11/2013 | Cahill | |
| 2015/0094926 | A1 | 4/2015 | O'Meachair | |

(Continued)

FOREIGN PATENT DOCUMENTS

| | | |
|---|---|---|
| JP | 06113404 | 4/1994 |
| JP | 2011-102105 | 5/2011 |

(Continued)

OTHER PUBLICATIONS

Search Report for GB Application No. 2113852.4 dated Jan. 12, 2022, 1 page.

(Continued)

*Primary Examiner* — Thomas W Irvin

(74) *Attorney, Agent, or Firm* — Nixon & Vanderhye P.C.

(57) ABSTRACT

An aircraft landing gear arrangement (1, 101) on an aircraft, the arrangement including a wheel (2, 22), a brake (6) operable to inhibit rotation of the wheel, one or more fan blades (7a, 7b) rotatable to cool the brake, and a brushless DC motor (8) operable to rotate the one or more fan blades.

18 Claims, 8 Drawing Sheets

(56)        References Cited

U.S. PATENT DOCUMENTS

2017/0305577 A1 *  10/2017  Bill ........................ B60T 17/22
2019/0078630 A1 *   3/2019  Serra ..................... H10N 10/13
2019/0136926 A1     5/2019  Bill
2019/0351997 A1 *  11/2019  Wilson ................... B64C 25/34
2022/0412418 A1 *  12/2022  Dai ........................ F16D 65/22
2023/0258238 A1 *   8/2023  Hogg ..................... B64C 25/42
                                                    188/218 A

FOREIGN PATENT DOCUMENTS

WO          82/04108        11/1982
WO          WO-8204108 A1 * 11/1982   ............. B64C 25/44

OTHER PUBLICATIONS

European Search Report cited in EP 22 19 7641, completed Jan. 13, 2023, 3 pages.

* cited by examiner

AIRCRAFT LANDING GEAR ARRANGEMENT

RELATED APPLICATION

This application incorporates by reference in its entirety and claims priority to United Kingdom patent application GB 2113852.4, filed Sep. 28, 2021.

FIELD

The present disclosure relates to the cooling of aircraft brakes.

The present invention concerns the cooling of aircraft brakes. More particularly, but not exclusively, this invention concerns an aircraft landing gear arrangement. The invention also concerns an aircraft comprising an aircraft landing gear arrangement and a method of cooling an aircraft landing gear brake.

BACKGROUND

Aircraft brakes can become very hot and cool relatively slowly without additional cooling. This means that brakes may have to be proactively cooled, particularly if an aircraft is to take-off shortly after landing. Such cooling may be provided using an external air blower that passes air onto the brake while the aircraft is parked. Many aircraft (such as the A320, A350 and A380) are provided with fans that are built into the landing gear arrangement, and which can be used to cool the brakes when the aircraft is moving, as well as when the aircraft is parked. While the present brake cooling arrangements are effective, some brake cooling arrangements are relatively heavy and can require somewhat complex integration with the tachometer and tyre pressure indicator system. Some such brake cooling arrangements are powered by the aircraft's wild frequency network, and have to be actively controlled to protect the cooling fans from being run too fast (overspeed). In this connection, such cooling fans must typically not be run at a frequency of more than 525 Hz.

The present invention seeks to mitigate the above-mentioned problems. Alternatively or additionally, the present invention seeks to provide an improved aircraft landing gear arrangement.

SUMMARY

The present invention may be embodied as an aircraft landing gear arrangement comprising: a wheel; a brake operable to inhibit rotation of said wheel; one or more fan blades rotatable to cool the brake; and a brushless DC motor operable to rotate the one or more fan blades.

The applicant has discovered that it is possible to cool an aircraft landing gear brake using a brushless DC motor. Brushless DC motors are typically simple, light and do not require the overspeed protection that is required for AC motors running from the wild frequency network.

The landing gear arrangement may comprise a means for converting thermal energy into electrical energy. For example, the landing gear arrangement may comprise a thermoelectric device. Alternatively or additional, the landing gear arrangement may comprise a photovoltaic material for converting electromagnetic energy emitted from the brake into electrical energy. Such an arrangement may use the means for converting thermal energy into electrical energy to power the brushless DC motor. The means for converting thermal energy into electrical energy may be located proximate to the brake. Optionally, the means for converting thermal energy into electrical energy is arranged to provide electrical energy to the brushless DC motor. Those skilled in the art will realise that one or more electrical components may be provided between the means for converting thermal energy into electrical energy and the brushless DC motor.

The landing gear arrangement may comprise a kinetic energy convertor for converting kinetic energy, such as rotational energy, into electrical energy. The landing gear arrangement may comprise a kinetic energy convertor for converting rotational energy of the wheel into electrical energy. Such an arrangement may use kinetic energy, such as rotational energy of the wheel, to provide electrical energy, which may be used, for example, to power the brushless DC motor and/or be stored in a suitable storage device, such as a battery and/or a capacitor. Optionally, the kinetic energy convertor may be arranged to provide electrical energy to the brushless DC motor and/or provided electrical energy to a storage device. Those skilled in the art will realise that one or more electrical components may be provided between the kinetic energy convertor and the brushless DC motor. The storage device (such as a battery and/or a capacitor) may be local to the motor, for example, or may be remote from the motor. The kinetic energy convertor may comprise a first portion that is movable relative to a second portion, movement of the first portion relative to the second portion causing the generation of electrical power. The first portion may be coupled to the wheel so that movement of the wheel causes movement of the first portion. The first portion need not be attached directly to the wheel. The second portion may, for example, be coupled to the axle. The second portion need not be directly attached to the axle, for example. The second portion may, for example, comprise the motor. In this connection, the motor may be used as a generator, if not being used as a motor. One of the first and second portions may comprise an electrical coil, and the other of the first and second portions may comprise one or more magnets. The first and second portions may therefore form an AC electrical generator. Components may be provided to convert AC electrical power to DC electrical power that may be used to power the brushless DC motor. The kinetic energy convertor may comprise a piezoelectric component. The kinetic energy convertor typically only provides electrical energy when the wheels are rotating i.e. during taxi, take-off and landing. The kinetic energy convertor may comprise the motor.

As mentioned above, a means for converting thermal energy into electrical energy and/or a kinetic energy convertor may be used to provide electrical energy to the motor. The motor may also be connected to an alternative aircraft DC power source. The alternative aircraft DC power source may be a battery (such as a battery local to the motor, or an auxiliary power unit battery), or a rectified AC power source.

As mentioned above, the one or more fan blades are rotatable to cool the brakes. Those skilled in the art will realise that the fan blades will typically not be used all of the time. Furthermore, the one or more fan blades (and optionally the casing, if present) may be lockable in a non-operating condition. In the non-operating condition, the one or more fan blades (and optionally the casing, if present) are not rotatable to cool the brakes. In the non-operating condition, the one or more fan blades, the casing (if present) and/or the motor may be used to convert kinetic energy into electrical energy. The one or more fan blades may be lockable in a non-operating condition to provide a kinetic energy conversion mode in which kinetic energy may be converted into electrical energy, using the kinetic energy convertor.

For example, in the non-operating condition, the one or more fan blades (and casing, if present) may be locked to the wheel so that rotation of the wheel causes rotation of the one or more fan blades (and casing, if present). In this case, the motor may be coupled to the axle, so that rotation of the wheel causes rotation of the one or more fan blades (and casing, is present) relative to the motor. The one or more fan blades may be provided with magnets and the motor may be provided with coils, movement of the one or more fan blades (and therefore magnets) relative to the coils causing the conversion of kinetic energy into electrical energy. Alternatively, one or more coils may be coupled to the one or more fan blades so that in the non-operating condition, movement of the wheel causes movement of the one or more fan blades, which in turn causes movement (optionally rotational movement) of one or more coils. The one or more coils is located in a magnetic field provided by one or more magnets coupled to the axle. Movement of the coils in the magnetic field generates electrical energy.

In the non-operating condition, the one or more fan blades (and casing, if present) may be locked to the axle, so that the wheel rotates relative to the one or more fan blades. The one or more fan blades (or casing, if present) may be provided with a magnet or coil. A cover may be provided, comprising a magnet or coil that is movable relative to the magnet or coil provided to the one or more fan blades, movement of the cover relative to the fan blades (and casing, if present) generating electrical energy.

The one or more fan blades (and casing, if present) may be locked to the wheel or the axle magnetically or physically.

The aircraft landing gear arrangement may be provided with a control module for controlling operation of the motor. The control module may be configured to control supply of electrical energy to the motor, optionally from one or more of the means for converting thermal energy into electrical energy, the kinetic energy convertor and the alternative aircraft DC power source.

The motor typically comprises a stator and a rotor, the rotor being coupled to the one or more fan blades so that rotation of the rotor causes rotation of the one or more fan blades.

The motor may comprise a casing. The rotor may comprise the casing, or the rotor may be coupled to the casing so that rotation of the rotor causes rotation of the casing. The one or more fan blades may be coupled to the casing so that rotation of the casing causes rotation of the one or more fan blades. The one or more fan blades may be attached to the casing. The one or more fan blades may project inwardly from the casing.

The wheel may comprise a wheel hub and a tyre mounted on the wheel hub. The wheel hub may comprise an outer portion for the mounting of a tyre thereon and a central portion for the receipt of an axle. A debris guard may be provided to inhibit ingress of debris into the central portion of the wheel hub and to protect the fan blades. The debris guard may be mounted on the central portion of the wheel hub.

The motor may be located within or adjacent to the wheel hub. If a debris guard is provided, then the debris guard may inhibit ingress of debris into the motor.

The landing gear arrangement may comprise a cover mountable on the wheel, optionally mountable on to the wheel hub and optionally mountable on the central portion of the wheel hub. The cover may define a cover volume in which the motor is located. The cover may comprise one or more wall portions and a lid portion, the wall portions and the lid portion defining the volume in which the motor is located. The lid portion may comprise a debris guard. The one or more wall portions may form a generally cylindrical shape. The cover may be seen as a hubcap.

As mentioned above, the landing gear arrangement may comprise means for converting thermal energy into electrical energy. The means for converting thermal energy into electrical energy may be positioned within the central portion of the wheel hub. The means for converting thermal energy into electrical energy may be located on a surface of the central portion of the wheel hub. If the landing gear arrangement comprises a cover that defines a cover volume, the means for converting thermal energy into electrical energy may be located in the cover volume.

The brake optionally comprises a brake stator, a brake rotor and an actuator for urging the brake rotor and brake stator into contact with one another, thereby engaging the brake. The means for converting thermal energy into electrical energy may be located on the brake stator or brake rotor. The brake optionally comprises a plurality of brake stators, a plurality of brake rotors and an actuator for urging adjacent brake rotors and brake stators into contact with one another, thereby engaging the brake. The means for converting thermal energy into electrical energy may be located on one or more of the brake stators or brake rotors.

The landing gear arrangement may comprise an axle on which the wheel is mounted. The means for converting thermal energy into electrical energy may be located on the axle.

As mentioned above, the landing gear arrangement may comprise a kinetic energy convertor for converting kinetic energy, such as rotational energy, for example rotational energy of the wheel, into electrical energy. At least one part of the kinetic energy convertor may be positioned within the central portion of the wheel hub. As mentioned above, the kinetic energy convertor may comprise a first portion that is movable relative to a second portion, movement of the first portion relative to the second portion causing the generation of electrical power. One or both of the first and second portions may be positioned within the central portion of the wheel hub. If the landing gear arrangement comprises a cover that defines a cover volume, one or both of the first and second portions may be located in the cover volume. One or both of the first and second portions may be attached to the cover. For example, the first portion (such as a magnet) may be attached to the cover. The second portion may be attached to a fan blade or to a casing, if present. The cover may rotate relative to the fan blade and casing, when the motor is not in use, thereby converting rotational motion of the cover into electrical energy. In such an arrangement, the fan blade and casing are optionally locked to the axle. The first portion may be coupled to the fan blades and casing, which may be, in turn, coupled to the wheel (for example, to the wheel cover) such that rotation of the wheel causes rotation of the first portion. The second portion may be coupled to the axle. For example, the second portion may be located into the axle.

The landing gear arrangement may comprise one or more sensors for determining a sensed parameter, such as temperature, the motor being operable dependent on the sensed parameter. For example, the brake may be provided with a temperature sensor. If the sensed temperature is greater than a predetermined temperature, the motor may be operable. If the sensed temperature is at or lower than the predetermined temperature, then the motor is not operable (i.e. the motor does not run).

The motor may be operable dependent on the phase of flight. For the avoidance of doubt, phase of flight includes, but is not limited to, taxi (both before take-off and after landing), take-off, ascent, cruise, descent, landing and park. For example, the motor may be operable to provide enhanced cooling during taxi and/or landing, periods during which brake usage is enhanced, and therefore brake temperature is higher. The motor may be operable to provide enhanced cooling while the aircraft is parked, for example, preceding a subsequent flight. Brakes may need to be cooled prior to a subsequent flight. This may be the case, for example, if the aircraft is making frequent landings and take-offs, for example if the aircraft is a short-haul aircraft.

The motor may be operable dependent on a predicted flight plan. Brake temperature at any particular point of a flight may be estimated or predicted from a flight plan. For example, brakes will be heavily used after landing to slow the aircraft and during taxi, and it may be desirable to cool the brakes dependent on the predicted temperature. On a long haul flight, the brakes may cool sufficiently without operation of the motor during the ascent, cruise and descent phases of flight. Alternatively, on a short haul flight, the duration of the ascent, cruise and descent phases may be insufficient to cool the brakes without operation of the motor, and therefore it may be desirable to operate the motor to cool the brakes, based on the predicted flight plan.

The motor may be operable dependent on more than one of a sensed parameter, a phase of flight and a predicted flight plan. For example, the motor may be operable dependent on a sensed temperature and a predicted flight plan of an aircraft.

The motor may be operable in a first, enhanced cooling mode and a second, reduced cooling mode. In the first, enhanced cooling mode, the motor is optionally operable to draw electrical power from one or both of the means for converting thermal energy into electrical energy and the kinetic energy convertor, and optionally from an alternative DC power source, such as a battery. In the second, reduced cooling mode, the motor is optionally operable to draw electrical power from one or both of the means for converting thermal energy into electrical energy and the kinetic energy convertor (but not from an alternative DC power source), and is optionally operable to draw electrical power from the means for converting thermal energy into electrical energy (but not from the kinetic energy convertor or the alternative DC power source).

For the avoidance of doubt, the aircraft landing gear arrangement may be provided with more than one wheel. For example, the aircraft landing gear arrangement may comprise two (and optionally only two) wheels. Such arrangements may be found on single aisle aircraft, such as the A320. The aircraft landing gear arrangement may comprise four (and optionally only four) wheels. Such arrangements may be found on twin aisle aircraft, such as the Boeing 787. More than one of the wheels may be provided with one or more fan blades rotatable to cool the brake and a brushless DC motor operable to power the one or more fan blades.

The aircraft landing gear arrangement of the first aspect of the present invention is optionally a main landing gear arrangement. In this connection, the nose landing gear wheels do not usually have brakes.

In accordance with a second aspect of the present invention, there is provided an aircraft comprising the aircraft gear landing arrangement of the first aspect of the present invention.

An aircraft comprising first and second aircraft landing gear arrangements of the first aspect of the present invention, the first aircraft landing gear arrangement being located on the port side of the aircraft and the second aircraft landing gear arrangement being located on the starboard side of the aircraft. Those skilled in the art will realise that certain larger aircraft may be provided with further landing gear arrangements in addition to the first and second aircraft landing gear arrangements.

In accordance with a third aspect of the present invention, there is provided a method of cooling an aircraft landing gear brake, the method comprising using a brushless DC motor to power one or more aircraft brake cooling blades.

The aircraft landing gear brake is typically operable to inhibit movement of a landing gear wheel.

The one or more blades are typically operable to cool the brake.

The method of the third aspect of the present invention may comprise any of the features of the landing gear arrangement of the first aspect of the present invention.

For example, the motor may be operated in a first, enhanced cooling mode in which the motor draws electrical power from one or both of the means for converting thermal energy into electrical energy and the kinetic energy convertor, and optionally from an alternative DC power source, such as a battery. The motor may be operated in the first, enhanced cooling mode during one or more of taxi, landing and park, optionally park prior to a subsequent flight. The motor may be operated in a second, reduced cooling mode in which the motor draws power from one or both of the means for converting thermal energy into electrical energy and the kinetic energy convertor, and optionally from the means for converting thermal energy into electrical energy. The motor may be operated in the second, reduced cooling mode during one or more of ascent, cruise and descent.

The method may comprise cooling the aircraft landing gear brake using an external cooling source, optionally when the aircraft is parked.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
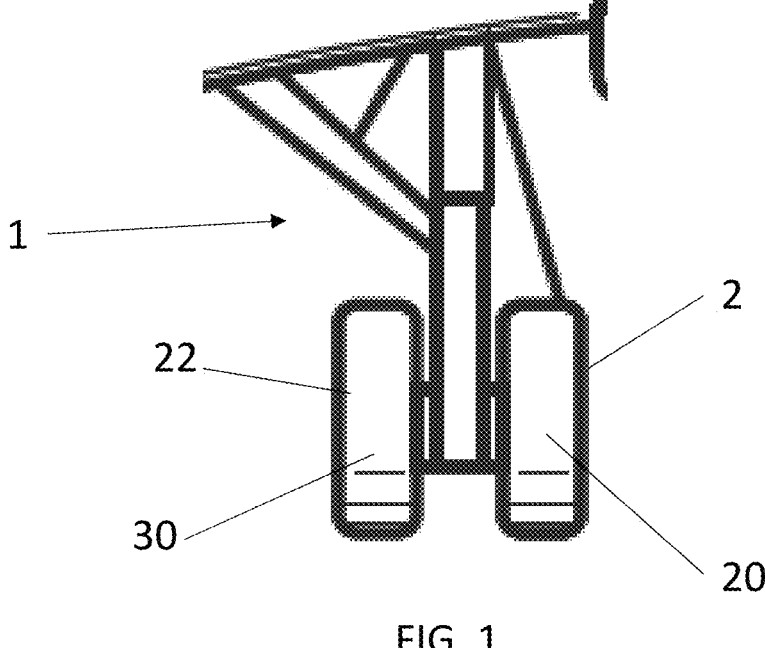
FIG. 1 shows a schematic view of an example of an aircraft landing gear arrangement according to a first embodiment of the invention.
Figure 2:
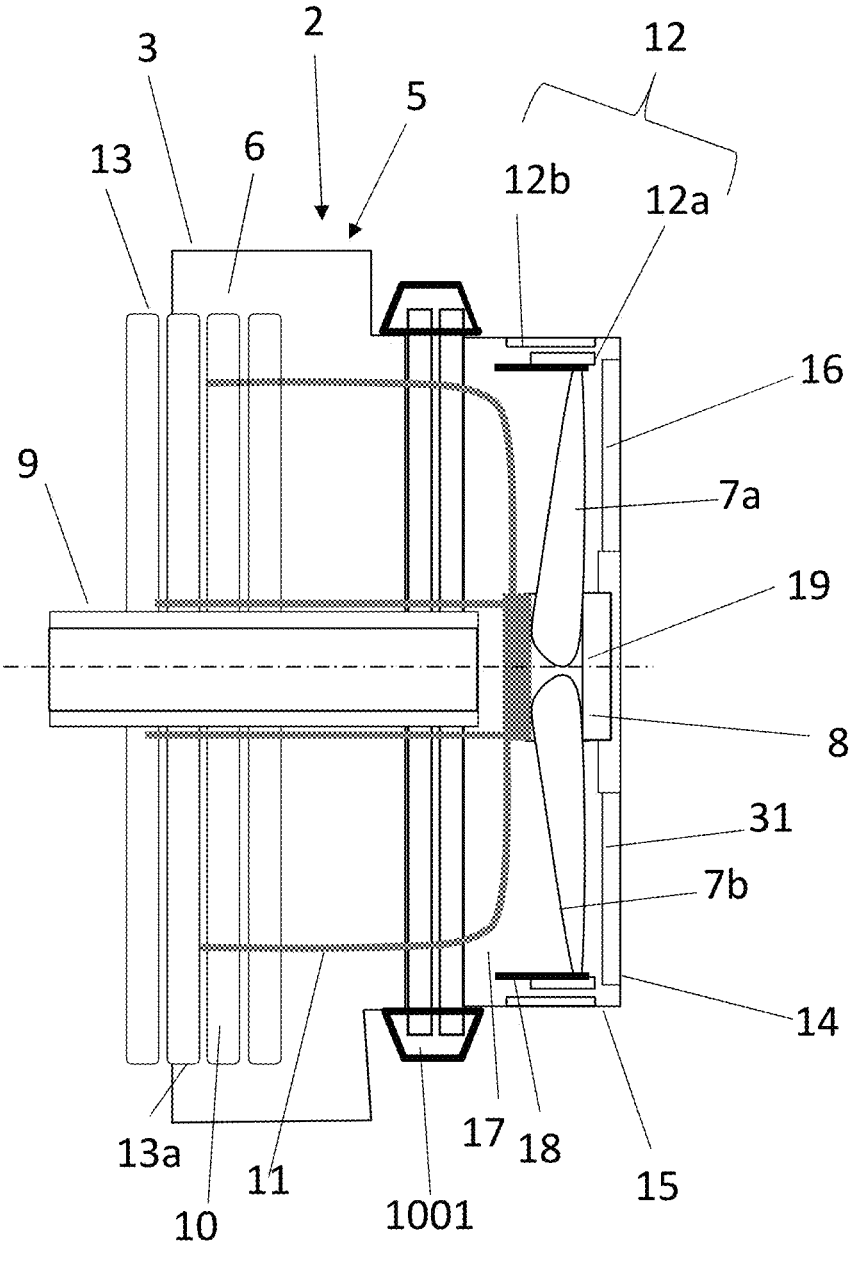
FIG. 2 shows a schematic cross-sectional view of part of the aircraft landing gear arrangement of FIG. 1.
Figures 3A, 3B:
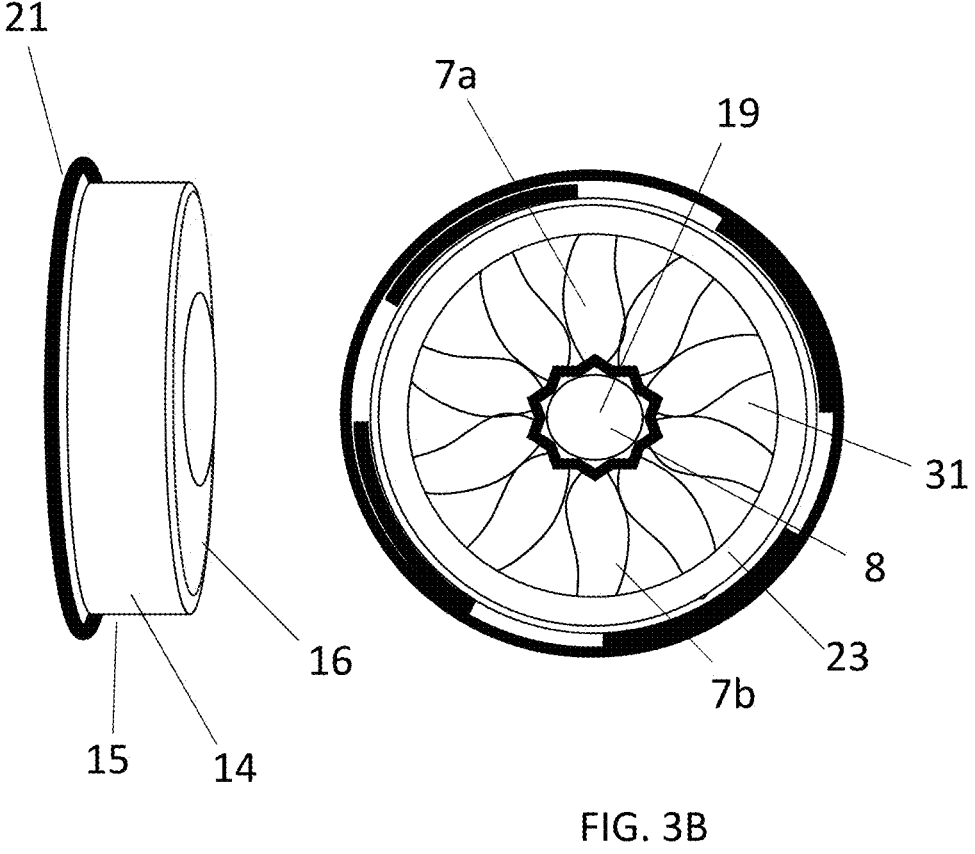
FIG. 3A shows a schematic perspective view of part of the aircraft landing gear arrangement of FIG. 1, showing the cover or hub cap.
FIG. 3B shows a schematic plan view of part of the aircraft landing gear arrangement of FIG. 1, showing the fan blades.

An example of an embodiment of an aircraft landing gear arrangement in accordance with the first aspect of the present invention will now be described with reference to FIGS. 1, 2, 3A and 3B. The aircraft landing gear arrangement is denoted generally by reference numeral 1, and comprises a first wheel 2, a brake 6 operable to inhibit rotation of said wheel, one or more fan blades 7a, 7b rotatable to cool the brake; and a brushless DC motor 8 operable to power the one or more fan blades. The aircraft landing gear arrangement is a main landing gear arrangement, as opposed to a nose landing gear arrangement.

First wheel 2 is rotatably mounted on axle 9, and comprises wheel hub 3 on the outer portion 5 of which is mounted a first tyre 20. The aircraft landing gear arrangement comprises a second wheel 22 which is also rotatably mounted on axle 9, and on which there is mounted a second tyre 30. The first 2 and second 22 wheels are mounted to the aircraft using conventional struts and shock absorbers (not shown), as will be well-known to those skilled in the art.

The braking process will now be briefly described. The brake 6 is applied when it is desired to slow the aircraft, for example, on landing or during taxi. In this connection, the brake 6 comprises a brake pack 13 comprising a plurality of brake stator elements 13a and a plurality of brake rotor elements (not shown) that may be brought into contact with one another to produce a braking effect. The brake stator elements 13a are provided with braking surfaces (not shown) made of suitable material (such as carbon). The brake rotor elements are coupled to first wheel 2 and the brake stator elements are coupled to a torque tube (not shown) such that the brake rotor elements rotate as the wheel rotates, and such that any retarding force applied to the brake rotor elements is applied to the wheel, therefore slowing rotation of the wheel. The brake 6 comprises an actuating piston (not shown) that pushes on a pressure plate (not shown), which urges the brake stator elements and brake rotor elements into contact with one another, the friction between adjacent brake rotor elements and brake stator elements slowing rotation of the brake rotor elements and therefore first wheel 2. Braking of the aircraft generates a significant amount of heat, heating the brake components to several hundred degrees Celsius. Excessive heating of the brake components is undesirable because it may facilitate oxidation of brake components, and may deleteriously affect the performance of the brakes (though this depends on the materials used to make the brake components). Furthermore, cooling of brakes facilitates quicker aircraft turn-around. In this connection, brakes have to be cooled sufficiently prior to take off so that in the event of a rejected take off the brakes do not exceed a certain temperature. It is therefore desirable to cool the brakes.

In this connection, the aircraft landing gear arrangement 1 comprises one or more fan blades 7a, 7b that are rotatable to cool the brake, and a brushless DC motor 8 operable to power the one or more fan blades. The fan blades (only two of which are labelled 7a, 7b) are attached via ring 23 to the casing 18 of motor 8. Casing 18 and fan blades 7a, 7b are rotatable about central axle 19 to provide movement of air through the brake pack 13, thereby cooling the brake pack 13. Movement of air may be in any direction, but typically air is drawn over the brake pack 13 and out through holes in the debris guard (see below). The brushless DC motor is relatively simple and does not suffer from the problems associated with many AC motors. For example, many AC motors are relatively heavy and can require somewhat complex integration with the tachometer and tyre pressure indicator system. Some such brake cooling arrangements are powered by the aircraft's wild frequency network, and have to be actively controlled to protect the cooling fans from being run too fast (overspeed). Furthermore, the motor 8 permits rotation of the casing 18 relative to a non-rotating central axle 19. Sensors can be attached to the static central axle 19.

Power for motor 8 is provided from three sources, management of which will be described below. The motor 8 is connected to a battery (now shown), which may be used to provide power. Aircraft landing gear arrangement 1 comprises a photovoltaic material 10 that is connected by electrical connections 11 to motor 8. A kinetic energy convertor 12 that converts rotational motion of first wheel 2 into electrical energy is also used to provide electrical energy to motor 8. Photovoltaic material 10 uses the thermophotovoltaic effect to generate electrical power, and is attached to a surface of brake pack 13. As mentioned above, braking generates a significant amount of heat, which leads to an increased temperature of brake components. Those brake components emit electromagnetic radiation, the wavelength of which depends on the temperature of the brake components but is typically in the infra-red and near infra-red part of the electromagnetic spectrum. The photovoltaic material 10 is selected to generate electrical energy based on the wavelength of the incident electromagnetic radiation. In the present case, the photovoltaic material is silicon, but may be germanium, gallium antimonide, indium gallium arsenide or indium gallium arsenide antimonide, for example. Electrical energy generated by the photovoltaic material 10 may be used contemporaneously by the motor 8 or may be stored (for example, using a battery or capacitor).

As mentioned above, the kinetic energy convertor 12 converts rotational movement of first wheel 2 into electrical energy. In this connection, kinetic energy convertor 12 comprises a first portion 12a that is coupled to the wheel, and which rotates relative to second portion 12b, thereby generating electrical energy. First portion 12a and second portion 12b form an AC generator. Kinetic energy convertor 12 comprises a rectifier (not shown) to convert the AC electrical power into DC that is usable by motor 8. Electrical energy generated by the kinetic energy convertor 12 may be used contemporaneously by the motor 8 or may be stored (for example, using a battery or capacitor).

A cover 14 is provided, the cover 14 comprising a cylindrical wall 15 and a lid 16 that together define a cover volume 17 in which motor 8 is located. The lid 16 is in the form of a debris guard that inhibits ingress of debris into the brake. Lid 16 is provided with a mesh 31 that permits passage of air therethrough. Cover 14 comprises flange 21 that is used to couple the cover 14 to axle 9. Second portion 12b of the kinetic energy convertor 12 is located in cover volume 17. Cover 14 is attached to wheel 2 using a V-band clamp 1001.

The example above describes the photovoltaic material 10 as being located in the brake pack 13. Photovoltaic material 10 may be located elsewhere. For example, photovoltaic material 10 may be located in cover volume 17. While the intensity of the radiation incident on the photovoltaic material 10 may be less than if the photovoltaic material 10 were located in the brake pack 13, location in the cover volume may be simpler.

The aircraft landing gear arrangement 1 comprise a brakes (not shown) configured to apply a braking force to second wheel 22. Second wheel 22 is provided with a DC motor and cooling blades arrangement such as that described above in relation to first wheel 2. The landing gear arrangement 1 comprises two further wheels (not shown) located rearwardly of the first 2 and second 22 wheels, each of which is provided with a cooling arrangement substantially as described above in relation to the first wheel 2.

Figure 4:
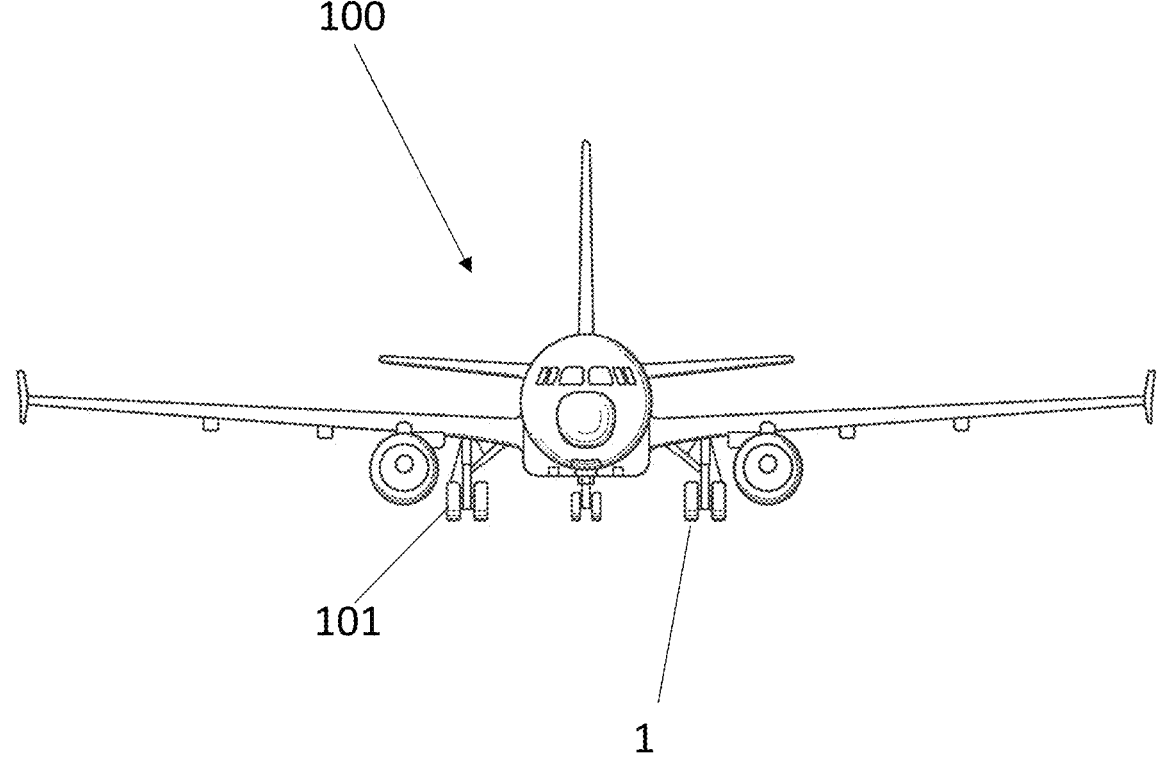
FIG. 4 shows a schematic perspective view of an example of an aircraft according to a second embodiment of the invention.

An example of an embodiment of an aircraft in accordance with the second aspect of the present invention will now be described with reference to FIG. 4. The aircraft is denoted generally by reference numeral 100, and comprises a first landing gear arrangement 1 and a second landing gear arrangement 101. First landing gear arrangement 1 is a port side landing gear arrangement, as described above with reference to FIGS. 1, 2, 3A and 3B. Second landing gear arrangement 101 is a starboard side landing gear arrangement that is identical to first landing gear arrangement 1, save that certain components are arranged differently to provide a starboard arrangement, as opposed to a port arrangement. The aircraft 100 is a single aisle aircraft, but may be any suitable aircraft.

Figure 5:
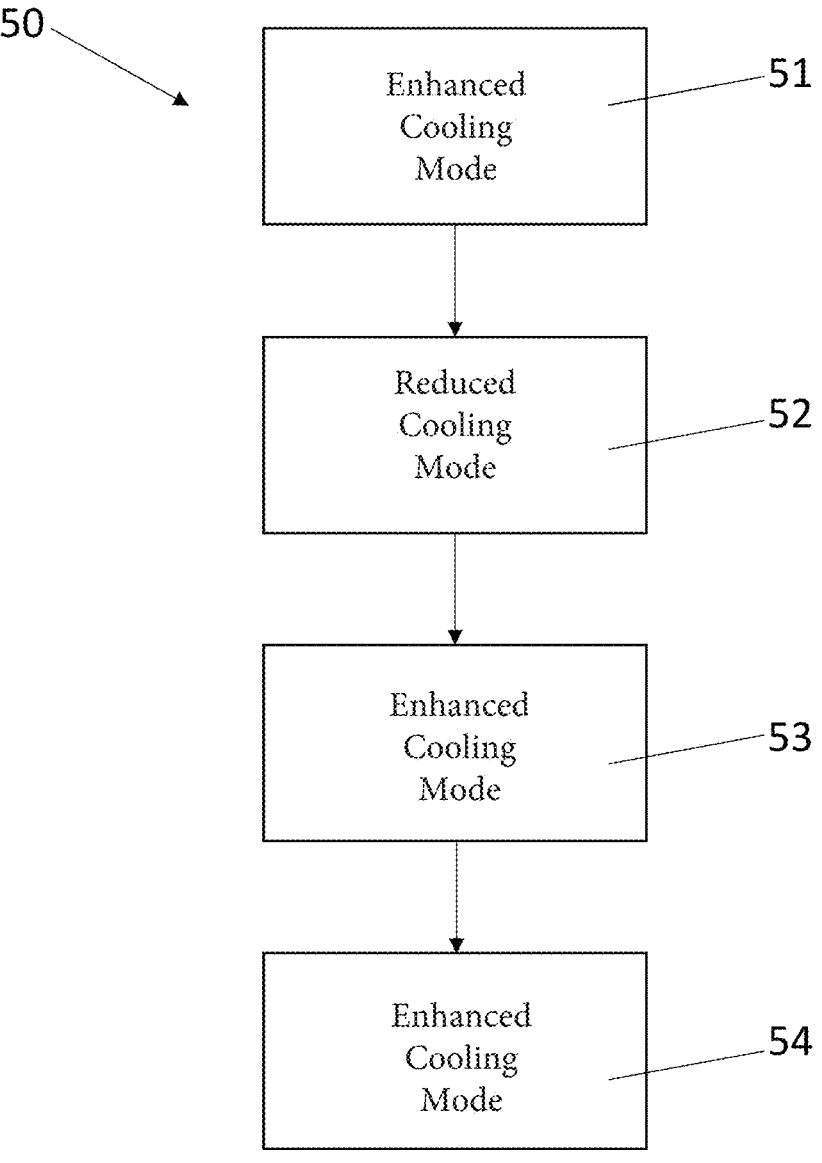
FIG. 5 shows a schematic of an example of a method of cooling aircraft landing gear brakes according to another embodiment of the invention.

An example of an embodiment of a method of cooling an aircraft landing gear brake will now be described with reference to FIG. 5. The method is denoted generally by reference numeral 50 and comprises using a DC brushless motor to rotate one or more blades to cool an aircraft landing gear brake. The method 50 comprises operating the motor in an enhanced cooling mode 51. For example, when the aircraft is taxiing to the runway, brakes are typically frequently applied to control the speed of the aircraft. This generates heat. The motor is operated in an enhanced cooling mode 51 to cool the brakes. In the enhanced cooling mode 51, the motor takes power from the kinetic energy convertor, the photovoltaic material and a battery to provide enhanced cooling to the brakes. The motor operates in enhanced cooling mode 51 until the aircraft is at cruising altitude, though it is acknowledged that once the aircraft has taken off, power is not provided from the kinetic energy convertor. At cruising altitude, the motor is operated in a reduced cooling mode 52, in which electrical power is supplied to the motor solely by the photovoltaic material. On descent, electrical power is supplied to the motor until in the reduced cooling mode 52 until the aircraft lands, at which point the motor is operated in an enhanced cooling mode 53 because slowing the aircraft after landing increases brake temperatures. In enhanced cooling mode 53, electrical power is provided to the motor from the kinetic energy convertor, the photovoltaic material and the battery. Once the aircraft is parked, the motor is operated in another enhanced cooling mode 54, in which electrical power is provided to the motor by the photovoltaic material and the battery. Furthermore, an external cooling fan is used to cool the brakes. This helps reduce turn-around time.

Operation of the motor in method 50 is determined by the phase of flight of the aircraft. It is possible to operate the motor dependent on sensor measurements, for example, dependent on temperature measurements.

Alternative kinetic energy conversion arrangements will now be described with reference to FIGS. 6, 7 and 8. In each of the landing gear arrangements of FIGS. 6, 7 and 8 the one or more fan blades are lockable in a non-operating condition in which the one or more fan blades do not cool the brake. When locked in the non-operating condition, the landing gear arrangement is in a kinetic energy conversion mode in when kinetic energy may be converted to electrical energy, as will now be described with reference to FIGS. 6, 7 and 8. Many of the features of the landing gear arrangements have been omitted from FIGS. 6, 7 and 8 for the purpose of clarity.

Figure 6:
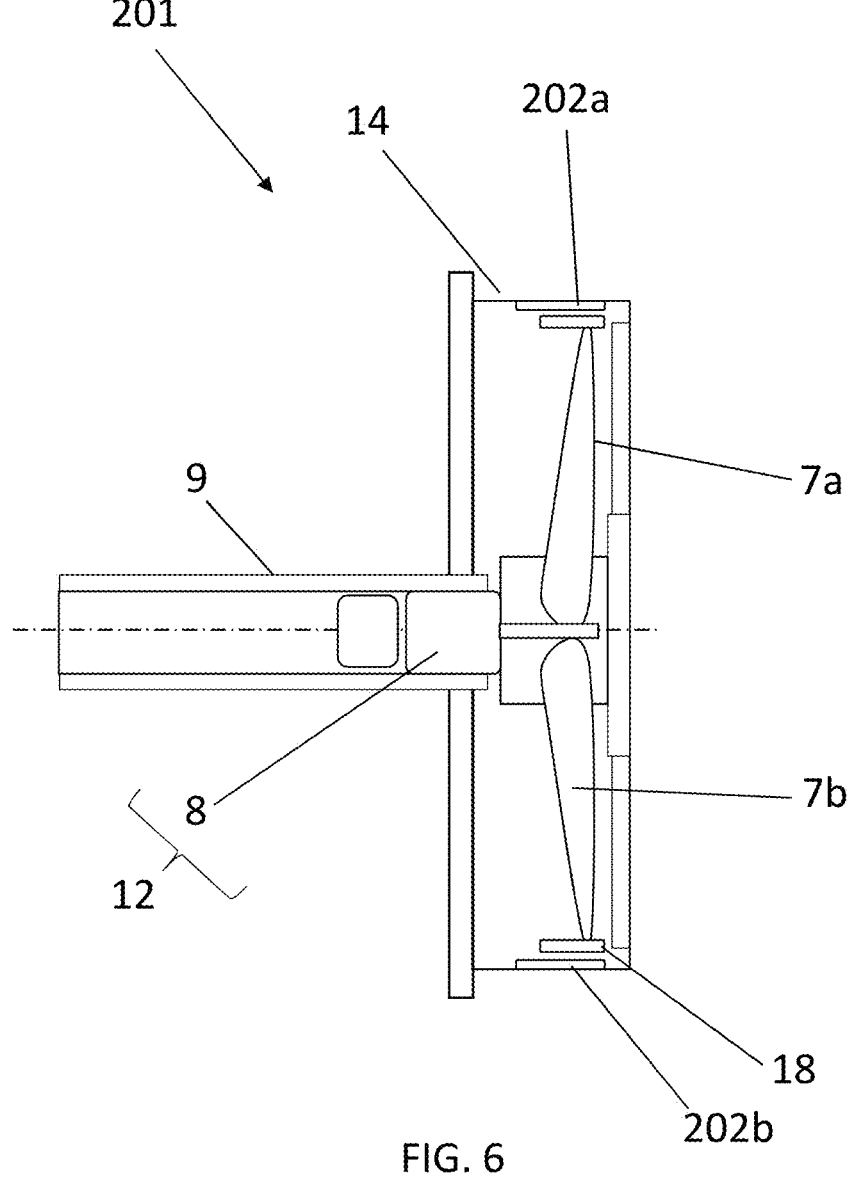
FIG. 6 shows a schematic cut-away side on view of part of a further example of a landing gear arrangement according to a further embodiment of the present invention, in which the one or more fan blades are lockable in a non-operating condition to a wheel cover.

FIG. 6 is a schematic side-on cut-away view of an aircraft landing gear arrangement denoted generally by reference numeral 201. Landing gear arrangement 201 comprises a DC brushless motor 8 that is used to power fan blades 7a, 7b to cool the brakes (omitted for clarity). Fan blades 7a, 7b are lockable in a non-operating condition, in which condition the landing gear arrangement may be used in a kinetic energy conversion mode to generate electrical power. In this connection, a cover 14 is provided in the form of a hubcap that is attached to a wheel (omitted for clarity). In the non-operating condition, fan blades 7a, 7b are locked to the wheel so that fan blades 7a, 7b rotate as the wheel rotates. Locking means 202a, 202b are provided on the inside of cover 14 which interact with fan locking means (not shown) that are provided on fan casing 18 to facilitate locking of the fan blades to the wheel. Locking means 202a, 202b and fan locking means may be magnetic or physical locking means. As mentioned above, in the non-operating mode, as the wheel rotates, fan blades 7a, 7b rotate. Motor 8 is located in axle 8. Rotation of fan blades 7a, 7b causes rotation of pick-ups in motor 8 relative to magnets provided in motor 8. This allows the motor 8 to act as a kinetic energy convertor 12, and to act as a generator. Electrical energy produced by motor 8 is stored in a battery or capacitor.

Figure 7:
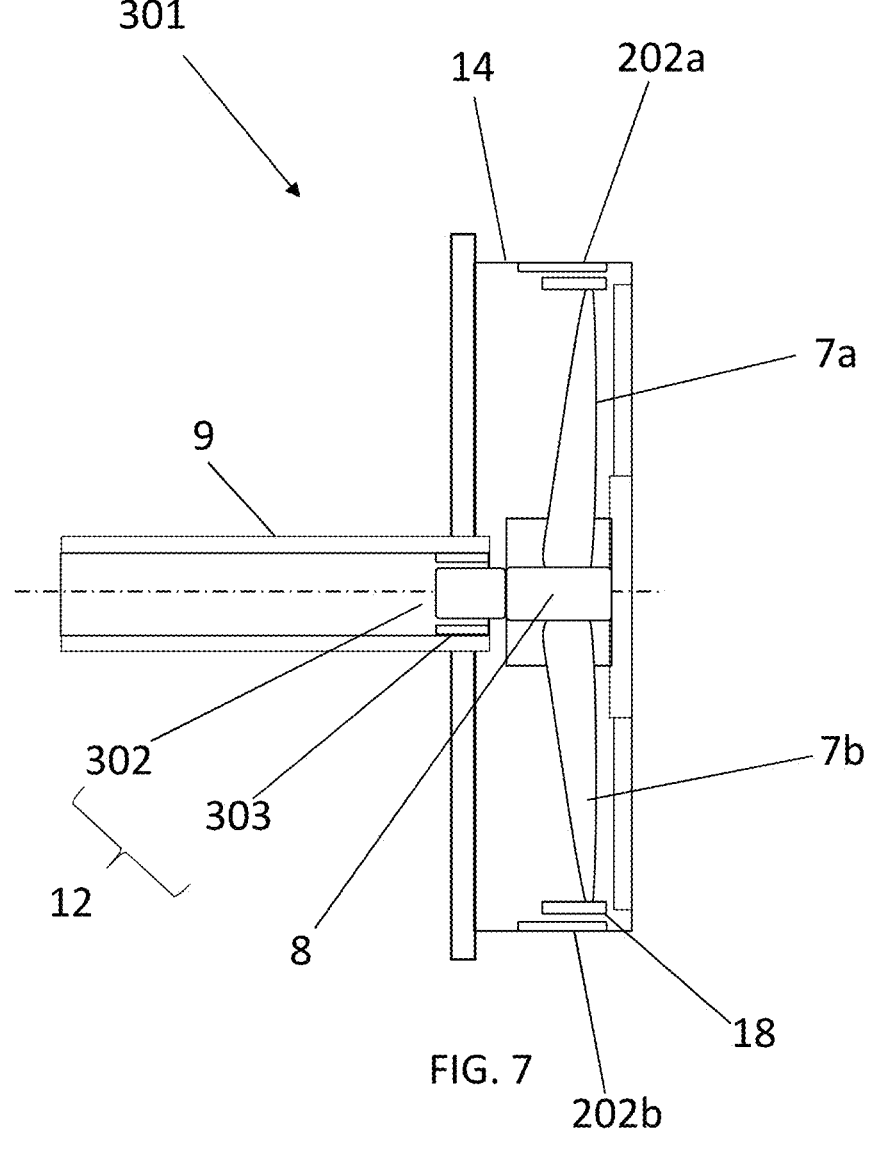
FIG. 7 shows a schematic cut-away side on view of part of another example of a landing gear arrangement according to a further embodiment of the present invention, in which the one or more fan blades are lockable in a non-operating condition to a wheel cover.

FIG. 7 is a schematic side-on cut-away view of an aircraft landing gear arrangement denoted generally by reference numeral 301. Landing gear arrangement 201 comprises a DC brushless motor 8 that is used to power fan blades 7a, 7b to cool the brakes (omitted for clarity). Fan blades 7a, 7b are lockable in a non-operating condition, in which condition the landing gear arrangement may be used in a kinetic energy conversion mode to generate electrical power. In this connection, a cover 14 is provided in the form of a hubcap that is attached to a wheel (omitted for clarity). In the non-operating condition, fan blades 7a, 7b are locked to the wheel so that fan blades 7a, 7b rotate as the wheel rotates. Locking means 202a, 202b are provided on the inside of cover 14 which interact with fan locking means (not shown) that are provided on fan casing 18 to facilitate locking of the fan blades to the wheel. Locking means 202a, 202b and fan locking means may be magnetic or physical locking means. As mentioned above, in the non-operating mode, as the wheel rotates, fan blades 7a, 7b rotate. Rotatable coils 302 are coupled to motor 8 so that rotation of fan blades 7a, 7b causes rotation of coils 302. Coils 302 are located within a ring of magnets 303 that are attached to the axle 9. Coils 302 and magnets 303 form part of kinetic energy convertor 12. When coils 302 rotate relative to magnets 303, electrical energy is generated, which is stored in a battery or capacitor.

When the fan of aircraft landing gear arrangements of FIGS. 6 and 7 is locked in a non-operating condition, the fan is locked to the wheel so that rotation of the wheel causes rotation of the fan blades. In the aircraft landing gear arrangement of FIG. 8, the fan is not locked to the wheel in the non-operating condition, but is locked to the axle. In this connection, FIG. 8 is a schematic side-on cut-away view of an aircraft landing gear arrangement denoted generally by reference numeral 401. Landing gear arrangement 401 comprises a DC brushless motor 8 that is used to power fan blades 7a, 7b to cool the brakes (omitted for clarity). Fan blades 7a, 7b are lockable in a non-operating condition, in which condition the landing gear arrangement may be used in a kinetic energy conversion mode to generate electrical power. In this connection, a cover 14 is provided in the form of a hubcap that is attached to a wheel (omitted for clarity). In the non-operating condition, fan blades 7a, 7b are locked to the axle 9 so that in the non-operating condition, the wheel rotates relative to fan blades 7a, 7b. Cover 14 is provided with magnets 402, and casing 18 is provided with coils 403, magnets 402 and coils 403 forming a kinetic energy convertor 12. As the wheel rotates relative to the axle, magnets 402 move relative to coils 403, thereby converting kinetic energy to electrical energy. Electrical energy is stored in a battery or capacitor.

Figure 8:
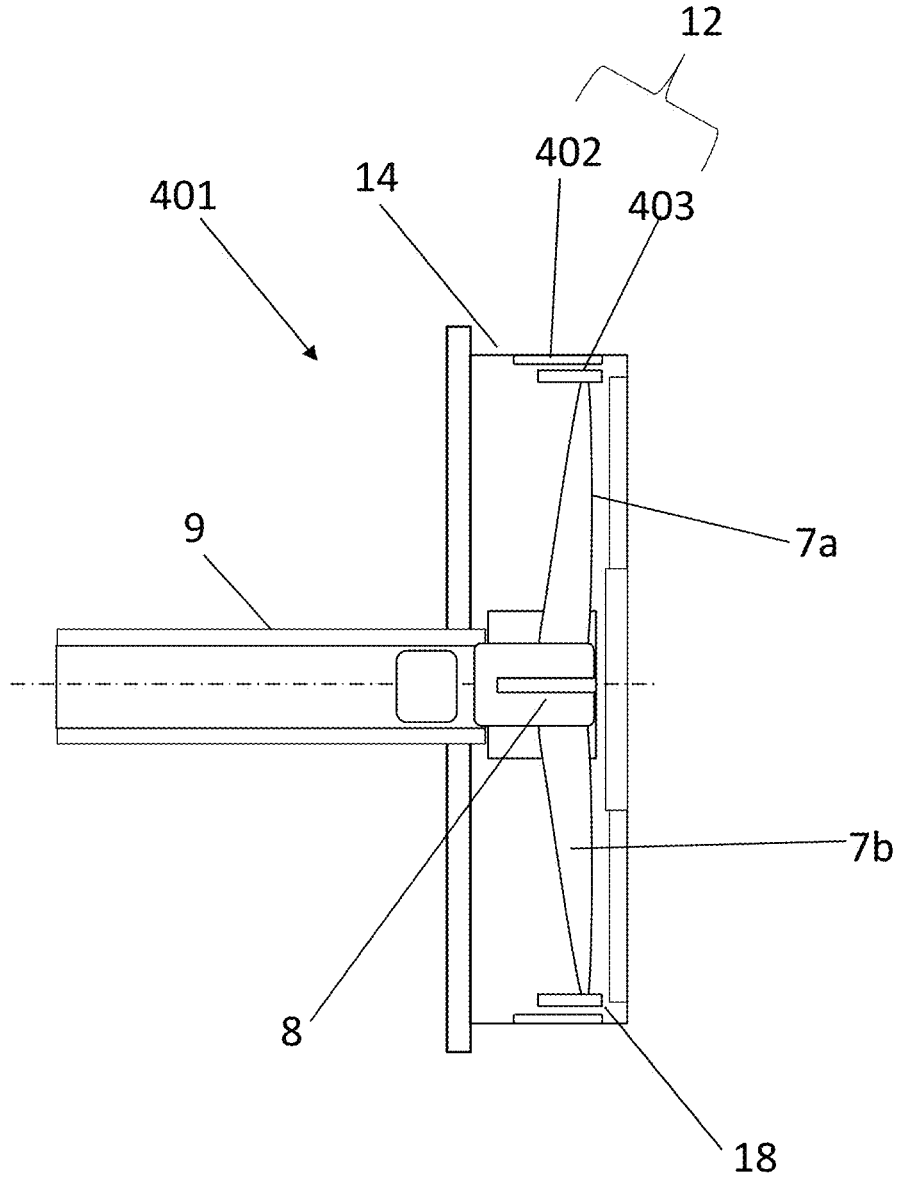
FIG. 8 shows a schematic cut-away side on view of part of another example of a landing gear arrangement according to a further embodiment of the present invention, in which the one or more fan blades are lockable in a non-operating condition to the axle.

The fan blades of the landing gear arrangements of FIGS. 6, 7 and 8 are lockable in a non-operating condition to permit conversion of kinetic energy to electrical energy. Those skilled in the art will realise that this need not be the case. For example, the wheel may be provided with one or more magnets proximate to one or more coils provided on the axle, movement of the wheel relative to the axle causing movement of the magnets relative to the coils, thereby converting kinetic energy into electrical energy. The fan blades may be operated while the wheel is rotating relative to the axle, and while kinetic energy is being converted into electrical energy.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe the use of a photovoltaic material. Alternatively or additionally, a thermoelectric device may be used to convert thermal energy into electrical energy.

While the examples above describe a motor that may be powered by the photovoltaic material and the kinetic energy convertor, those skilled in the art will realise that while those features are preferred, they are not essential features of the present invention.

The example above describes the fan blades being attached to the casing of the motor. Those skilled in the art will realise that other arrangements are possible, for example, the fan blades being attached to a central rotating axle.

The examples above describes the photovoltaic material being attached to a stator in the brake pack. Those skilled in the art will realise that the photovoltaic material may be located elsewhere.

The example above shows that the motor is located in a cover that is attached to the wheel hub. Those skilled in the art will realise that other arrangements are possible, for example, by locating the motor within the wheel hub itself.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. In addition, in this disclosure, the terms "comprise" or "comprising" do not exclude other elements or steps, the terms "a" or "one" do not exclude a plural number, and the term "or" means either or both, unless the this application states otherwise.

The invention claimed is:

1. An aircraft landing gear arrangement comprising:
a wheel;
a brake operable to inhibit rotation of said wheel;
one or more fan blades rotatable to cool the brake;
a brushless DC motor operable to rotate the one or more fan blades;
a thermoelectric device configured to convert thermal energy from the brake into electrical energy and configured to provide the electrical energy to the brushless DC motor, and
a cover mountable on the wheel, the cover defining a cover volume within which is the brushless DC motor;
wherein the thermoelectric device is within the cover volume.

2. The aircraft landing gear arrangement according to claim 1, further comprising a thermoelectrical device configured to convert thermal energy generated by the brake into electrical energy.

3. The aircraft landing gear arrangement according to claim 2, in which the brake comprises a brake stator, a brake rotor and an actuator configured to urge the brake rotor and brake stator into contact with one another, thereby engaging the brake, and in which the thermoelectric device is on the brake stator or brake rotor.

4. The aircraft landing gear arrangement according to claim 2, further comprising an axle on which the wheel is mounted, and the thermoelectric device is on the axle.

5. The aircraft landing gear arrangement according to claim 1, further comprising a kinetic energy convertor configured to convert kinetic energy from the wheel into electrical energy.

6. The aircraft landing gear arrangement according to claim 5, in which the one or more fan blades are lockable in a non-operating condition during a kinetic energy conversion mode in which kinetic energy is converted into electrical energy by the kinetic energy convertor.

7. The aircraft landing gear arrangement according to claim 1, in which the brushless DC motor comprises a stator and a rotor, the rotor is coupled to the one or more fan blades, wherein rotation of the rotor rotates the one or more fan blades.

8. The aircraft landing gear arrangement according to claim 1, in which the brushless DC motor comprises a stator, a rotor and a casing fixed to the rotor, wherein the one or more fan blades is coupled to the casing so that rotation of the casing rotates the one or more fan blades.

9. The aircraft landing gear arrangement according to claim 1, in which the cover comprises one or more wall portions and a lid portion, the one or more wall portions and the lid portion defining the cover volume.

10. The aircraft landing gear arrangement according to claim 1, further comprising one or more sensors configured to determine a sensed parameter, the brushless DC motor is configured to be:

operable dependent on the sensed parameter, and/or operable dependent on a phase of flight of an aircraft, and/or operable dependent on a predicted flight plan of an aircraft which includes the aircraft landing gear arrangement.

11. The aircraft landing gear arrangement according to claim 1, in which the brushless DC motor is operable in a first, enhanced cooling mode and a second, reduced cooling mode.

12. The aircraft landing gear arrangement according to claim 11, further comprising:

an alternative aircraft DC power source or a rectified AC power source, wherein, during the first, enhanced cooling mode, the brushless DC motor is operable to draw electrical power from the alternative aircraft DC power source or the rectified AC power source, and during the second, reduced cooling mode, the brushless DC motor is electrically isolated from the alternative aircraft DC power source and the rectified AC power source, and is configured to draw electrical power from the thermoelectric device configured to convert thermal energy from the brake into electrical energy.

13. An aircraft comprising a first landing gear arrangement and a second aircraft landing gear arrangement each according to claim 1, the first aircraft landing gear arrangement is located on a port side of the aircraft and the second aircraft landing gear arrangement being located on a starboard side of the aircraft.

14. A method of cooling an aircraft landing gear brake, the method comprising:

operating a brushless DC motor to power one or more aircraft brake cooling blades in a:

first enhanced cooling mode in which the brushless DC motor draws electrical power from at least one of: (i) a thermoelectric device or photovoltaic material configured to convert thermal energy from the brake into electrical energy or (ii) a kinetic energy convertor, and second reduced cooling mode in which the brushless DC motor draws power from one or both of: (i) the thermoelectric device configured to convert thermal energy from the brake into electrical energy or (ii) the kinetic energy convertor.

15. An aircraft landing gear arrangement comprising:

a wheel;

a brake operable to inhibit rotation of said wheel;

one or more fan blades rotatable to cool the brake;

a brushless DC motor operable to rotate the one or more fan blades;

a kinetic energy convertor configured to convert kinetic energy from the wheel into electrical energy, and a cover mountable on the wheel, the cover defining a cover volume within which is the brushless DC motor;

wherein at least a portion of the kinetic energy convertor is within the cover volume.

16. The aircraft landing gear arrangement according to claim 15, in which the kinetic energy convertor comprises a first portion movable relative to a second portion, movement of the first portion relative to the second portion generates electrical power, and in which one or both of the first portion and the second portion is within the cover volume.

17. The aircraft landing gear arrangement according to claim 15, in which the brushless DC motor is operable in a first, enhanced cooling mode and a second, reduced cooling mode.

18. The aircraft landing gear arrangement according to claim 17, further comprising:

an alternative aircraft DC power source or a rectified AC power source;

wherein, during the first, enhanced cooling mode, the brushless DC motor is operable to draw electrical power from the alternative aircraft DC power source or the rectified AC power source, and during the second, reduced cooling mode, the brushless DC motor is electrically isolated from the alternative aircraft DC power source and the rectified AC power source and is configured to draw electrical power from the kinetic energy convertor.

* * * * *